US005749563A

United States Patent [19]

Hosaka et al.

[11] Patent Number: 5,749,563

[45] Date of Patent: May 12, 1998

[54] EXHAUST GAS RECIRCULATION SYSTEM

[75] Inventors: Yuji Hosaka; Yasuhiro Makibayashi; Tomoyuki Kumagai; Tatsuaki Nakanishi, all of Aichi-Ken, Japan

[73] Assignees: Taiho Kogyo Co., Ltd.; Toyota Jidosha Kabushiki Kaisha, both of Toyota, Japan

[21] Appl. No.: 785,897

[22] Filed: Jan. 21, 1997

[30] Foreign Application Priority Data

Jan. 26, 1996 [JP] Japan .................................. 8-032655

[51] Int. Cl.[6] .......................... F16K 31/126; F02M 25/07

[52] U.S. Cl. .......................... 251/61.5; 123/568; 137/240

[58] Field of Search ................................ 251/61.3, 61.4, 251/61.5; 123/568, 570; 137/240; 92/97, 100, 49

[56] References Cited

U.S. PATENT DOCUMENTS 3,902,696 9/1975 Ito et al. ................................ 251/61.5
4,052,969 10/1977 Ando et al. ............................ 251/61.5
4,120,480 10/1978 Ando et al. ............................ 251/61.5
4,239,181 12/1980 Brakebill ................................ 251/61.5
4,497,335 2/1985 Masuda .................................. 251/61.5

*Primary Examiner*—George L. Walton
*Attorney, Agent, or Firm*—Flynn, Thiel, Boutell & Tanis, P.C.

[57] ABSTRACT

The invention relates to an exhaust gas recirculation system as may be used in an engine of an automobile or the like. A housing is provided with an exhaust gas recirculation passage, which may be opened or closed by a valve connected to a diaphragm. The valve includes a rod which is guided by a guide bushing for movement back and forth. A securing protective cover mounted on the housing and a cup-shaped movable protective cover mounted on the diaphragm prevent ingress of a foreign matter between the guide bushing and the valve. An air passage is formed in the movable protective cover. With this construction, the provision of the air passage prevents a negative pressure from prevailing in the movable protective cover, thus preventing a foreign matter such as water or dust which may be deposited on the housing or the like from being drawn into a clearance between the guide bushing and the valve.

7 Claims, 5 Drawing Sheets

EXHAUST GAS RECIRCULATION SYSTEM

FIELD OF THE INVENTION

The invention relates to an exhaust gas recirculation system as may be used in an engine of an automobile or the like, and more particularly, to an exhaust gas recirculation system which is provided with a cup-shaped movable protective cover which prevents ingress of a foreign matter between a valve and a guide bushing which guides the valve for movement back and forth therein.

DESCRIPTION OF THE PRIOR ART

An exhaust gas recirculation system is known in the art which includes an exhaust gas recirculation passage formed in a housing, a diaphragm case disposed in the housing, a diaphragm disposed in the diaphragm case to partition the interior of the diaphragm case to define pressure chambers, a valve connected to the diaphragm for movement back and forth to engage with or disengage from a valve seat to open or close the exhaust gas recirculation passage, a guide bushing mounted on the housing for guiding the valve for movement back and forth therein, and a cup-shaped movable protective cover mounted on the diaphragm to prevent ingress of a foreign matter between the guide bushing and the valve (see Japanese Laid-Open Utility Model Application No. 114,451/84).

Purpose of the cup-shaped movable protective cover is to prevent ingress of a foreign matter such as water or dust between the guide bushing and the valve, but the performance achieved thus far is less than satisfactory. In particular, when a clearance between the guide bushing and the valve is made as small as possible in order to optimize the prevention of the ingress of a foreign matter between the guide bushing and the valve, the ingress of water or the like becomes more likely to occur than when the clearance was larger, thereby causing a malfunctioning.

An investigation into the cause of this phenomenon revealed that a high negative pressure, as may be caused by a negative pressure in an intake manifold, may be produced in the exhaust gas recirculation passage depending on the operating condition of the automobile, whereby the interior of the movable protective cover may assume a negative pressure. The air then finds its way through the movable protective cover and through the clearance between the guide bushing and the valve to be drawn into the exhaust gas recirculation system. In the course of this occurring, the air flows through the clearance between an end face adjacent to an opening of the movable protective cover and the housing while entangling a foreign matter such as water or dust deposited on the surface of the housing, which would be drawn into the exhaust gas recirculation system.

This explains why a sufficient effect has not been attained by the provision of a movable protective cover in preventing the ingress of foreign matter such as water or dust. In particular, when the clearance is made as small as possible, the flow velocity of the air will increase, more intensely transferring such foreign matter. In addition, when the clearance is made as small as possible, as the movable protective cover moves toward the guide bushing, the end face of the movable protective cover which is located adjacent to an opening thereof will be immersed in rainwater which is accumulated in the housing to be sealed thereby. If the interior of the movable protective cover assumes a negative pressure under this condition, the rainwater which is in contact with the end face of the protective cover will be more likely to be drawn into the exhaust gas recirculation system.

SUMMARY OF THE INVENTION

In view of the foregoing, the invention provides an exhaust gas recirculation system which is capable of more reliably preventing the ingress of a foreign matter such as water into a clearance between a guide bushing and a valve as compared with the prior art.

Specifically, in accordance with the invention, an exhaust gas recirculation system which is constructed in the manner mentioned above includes an air passage formed in a movable protective cover.

With the construction of the invention, if a negative pressure is produced within an exhaust gas recirculation passage depending on the operating condition of an automobile to cause a negative pressure to prevail within a movable protective cover, an air can flow into the movable protective cover from the air passage. Since the air which flows through the air passage at this time will flow at a location more removed from the surface of the housing than the air which flows into the movable protective cover through the clearance between the end face of the protective cover and the housing, thus reducing the effect of entangling a foreign matter such as water or dust which is deposited on the housing.

This effectively prevents a foreign matter such as water or dust which is deposited on the housing as well as rainwater accumulated in contact with the end face of the protective cover from being drawn into the exhaust gas recirculation system from the sliding surfaces between guide bushing and the valve, thus favorably preventing a malfunctioning from occurring as a result of the ingress of rainwater onto the sliding surfaces.

Above other objects, futures and advantages of the invention will become apparent from the following description of preferred embodiments thereof with reference to the attached drawings.

DETAILED DESCRIPTION OF THE EMBODIMENTS

Figure 1:
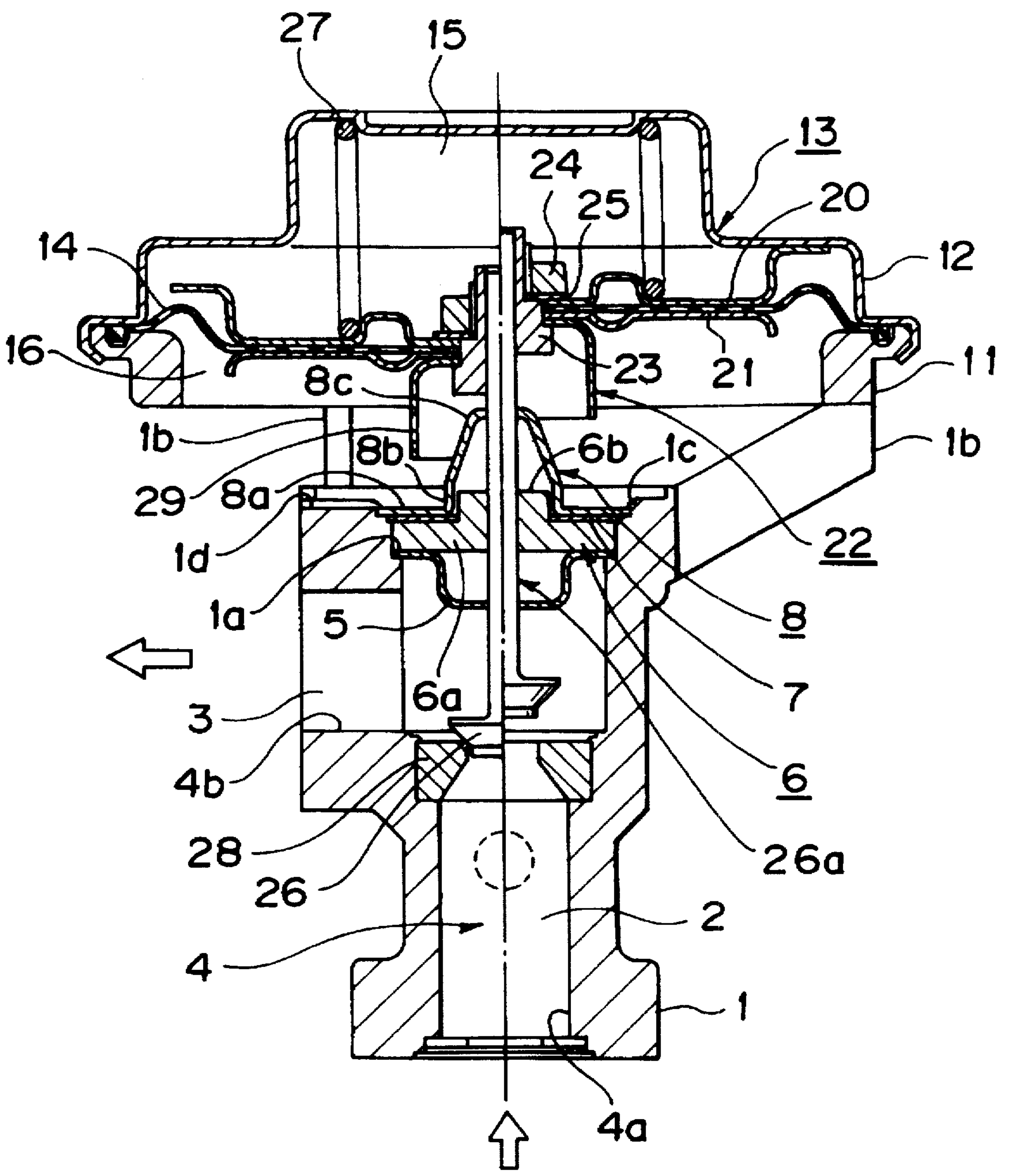
FIG. 1 is a cross section of a first embodiment of the invention, illustrating different operating conditions on the opposite sides of a centerline.

Referring to the drawings, several embodiments of invention will now be described. Referring to FIG. 1, a housing 1 is formed with a vertically extending passage 2 which is open at both its top and bottom ends. Passage 3 continues from an upper portion of the passage 2, and the both passage 2, 3 form together a substantially inverted L-shaped exhaust gas recirculation passage 4. The bottom opening of the path 2 serves as exhaust gas inlet 4*a* while the opening of the passage 3 serves as an exhaust gas exhaust port 4*b*. The inlet 4*a* is connected to an exhaust system of an engine, and the port 4*b* is connected to a suction system of the engine.

A step 1*a* is formed around the inner peripheral surface of the housing 1 in the top opening of the passage 2, and has a diameter which increases toward the top. A substantially dish-shaped plate 5 is placed on the step 1*a*, and a guide bushing 6 is placed on the plate 5. The guide bushing 6 comprises a stepped tubular body including a lower portion 6*a* of an increased diameter and an upper portion 6*b* of a reduced diameter, with the lower portion 6*a* placed on the plate 5.

A heat insulator 7 is placed on the lower portion 6*a*, and a securing protective cover 8 is placed on the insulator 7 with the outer periphery of the securing protective cover 8 being secured to the housing 1 by caulking. The insulator 7 may be replaced by a heat resistant elastomer. Where an elastomer is used, it can accommodate for a differential thermal expansion as between the guide bushing 6 and the housing 1 and can also hold the guide bushing 6 elastically. By utilizing an elastic caulking, it may be secured to the housing 1. Alternatively, a combined elastomer and heat insulator may be used.

The securing protective cover 8 comprises a flange 8*a* which is placed on top of the insulator 7, a tubular portion 8*b* continuing from the inner periphery of the flange 8*a* and extending upward in surrounding relationship with the upper portion 6*b* of the guide bushing 6, and a conical formation 8*c* which continues from the top end of the tubular portion 8*b* and narrowing toward the top end.

An annular lower case 11 is integrally mounted on top of the housing 1 by means of three arms 1*b* (only two arms 1*b* shown in the drawings) which are spaced apart at a given spacing or at an equal interval circumferentially, and an upper case 12 is secured on top of the lower case 11. The lower and the upper case 11, 12 constitute together a diaphragm case 13.

In the present embodiment, one of the arms 1*b* (the arm shown on the right-hand side of FIG. 1) extends in a radial direction from a vertically extending centerline of the housing 1 while the remaining two arms are disposed to be orthogonal to the lengthwise direction of the right-hand arm. Accordingly, the remaining two arms and the right-hand arm are disposed in a T-configuration when viewed in plan view. The number of arms 1*b* is not limited to three, but any suitable number of arms may be used. However, because they are provided integrally with the housing 1 and in order to reduce the weight, they are formed of a material such as aluminium alloy or magnesium alloy, by a die casting technique. A different material may be used for the housing 1. For example, ferro-alloy may be used in order to enhance the thermal resistance.

A diaphragm 14 is received within the diaphragm case 13 and has an outer periphery which is held sandwiched between the lower and the upper case 11, 12. In this manner, pressure chambers, or specifically, a negative pressure chamber 15 and an atmospheric pressure chamber 16 are defined within the diaphragm case 13. The negative pressure chamber 15 communicates with a suction system of an engine, not shown, while the atmospheric pressure chamber 16 communicates with the atmosphere through a gap between the three arms 1*b*.

In addition, a pair of plates 20, 21 are disposed in overlapping relationship with a central portion of the diaphragm 14 above and below it, and a cup-shaped movable protective cover 22 is disposed in overlapping relationship with a central portion of the lower plate 21. The both plates 20, 21, the movable protective cover 22 and the diaphragm 14 are integrally connected together by a retainer 23, a nut 24 and a washer 25.

The retainer 23 includes a shank portion into which a rod 26*a* of a valve 26 is inserted as a press fit and is then integrally connected together by soldering while maintaining a hermetic seal, the rod 26*a* slidably extending through the securing protective cover 8, the guide bushing 6 and the plate 5. A compression spring 27 is disposed between the upper case 12 and the diaphragm 14, and the resilience of the spring 27 urges the valve 26 downward, whereby it is normally seated upon a valve seat 28 mounted on the housing 1, thus closing the exhaust gas recirculation passage 4.

The movable protective cover 22 is arranged to maintain a coverage of the top end of the securing protective cover 8 if it is moved up and down by the diaphragm 14, thus preventing ingress of a foreign matter from the exterior, such as rainwater or dust, directly into a clearance between the guide bushing 26 and the rod 26*a* of the valve 26.

The movable protective cover 22 is formed with an air passage 29, which is formed at a median position circumferentially between a pair of adjacent arms 1*b*. The entire exhaust gas recirculation system is mounted on an engine in an orientation such that it is difficult for rainwater to find its way into the air passage 29. Specifically, while the exhaust gas recirculation system is installed in an engine room, because the direction in which rainwater finds its way into the engine room during running of an automobile remains substantially constant, the air passage 29 is disposed so as to face away from the direction of ingress of rainwater.

Where the outer periphery of the securing protective cover 8 is secured to the housing 1 by caulking, there is a need for a peripheral portion 1*c* on the housing 1 which allows the caulking to be performed at a location above the flange 8*a* which represents the outer periphery of the securing protective cover 8. The flange 8*a* will then be surrounded by such peripheral portion 1*c*, whereby water tends to accumulate on top of the flange 8*a*. To accommodate for this, in the present embodiment, the peripheral portion 1*c* is partly formed with a water release groove 1*d* at a location below the air passage 29. The bottom surface of the water release groove 1*d* is substantially flush with the upper surface of the flange 8*a*. The upper surface of the upper portion 6*b* of the guide bushing 6 projects above the upper surface of the peripheral portion 1*c*.

It is preferred that a size of the movable protective cover 22 in the vertical direction be chosen such that when the valve 26 is opened to its maximum extent, the lower end of the movable protective cover 22 extends below the top end of the securing protective cover 8, thus overlapping it. When the valve 26 is closed, a given clearance is formed between the lower end of the movable protective cover 22 and the housing 1 or the upper surface of the flange 8*a*.

Where the securing protective cover 8 is provided with a tubular portion 8*b*, it is desirable that when the valve 26 is closed, the lower end of the movable protective cover 22 is located above the top of tubular portion 8*b*, or slightly above the lower end of the conical formation 8*c* in the present embodiment.

With the described construction, when the valve 26 is seated upon the valve seat 28 under the resilience of the compression spring 27 to close the exhaust gas recirculation passage 4, or when the diaphragm 14 and the movable protective cover 22 moved down to bring the end face of the protective cover 22 close to the upper surface of the flange 8a of the securing protective cover 8, if a high negative pressure is produced within the exhaust gas recirculation passage 4 to cause a negative pressure to prevail in the movable protective cover 22, the air flows into the movable protective cover 22 from the air passage 29 which is formed in the movable protective cover 22.

It will be seen that the air which flows thorough the air passage 29 at this time follows a path which is more removed from the surface of the flange 8a than the air which flows into the movable protective cover 22 from the clearance between the end face of the movable protective cover 22 and the flange 8a, thereby reducing the effect that the air flow entangles a foreign matter such as water or dust which is deposited on the housing 1 or flange 8a. Since the foreign matter can be effectively prevented from being drawn into the exhaust gas recirculation system from the sliding surfaces between the guide bushing 6 and the rod 26a of the valve 26, a malfunctioning which result from the ingress of rainwater into these sliding surfaces can be prevented in a favorable manner. Where the lower end of the movable protective cover 22 is spaced by a given clearance when the valve 26 is closed, drawing rainwater or the like from the lower end of the protective cover can also be prevented in a favorable manner.

Since the securing protective cover 8 is provided with the conical formation 8c which narrows toward the diaphragm 14, the area of the upper surface of the conical formation 8c can be reduced than when a cylindrically configuration is employed for the corresponding part, and this contributes to effectively preventing the deposition of droplets of splattered water onto the upper surface or the ingress of such deposited droplets into the sliding surfaces.

In addition, the provision of the conical formation 8c result in an area of opening between the end face of the movable protective cover 22 and the conical formation 8c which increases as the movable protective cover 22 is displaced upwardly from its lower end position. As a consequence, the flow velocity of the air which tends to flow between the end face of the movable protective cover 22 and the conical formation 8c can be reduced to a greater degree than when a simple cylindrical configuration is used for the part which corresponds to the conical formation 8c. In this respect, the effect of entangling a foreign matter such as water or dust which is deposited on the housing 1 or flange 8a by the air flow can also be reduced.

Figure 8:
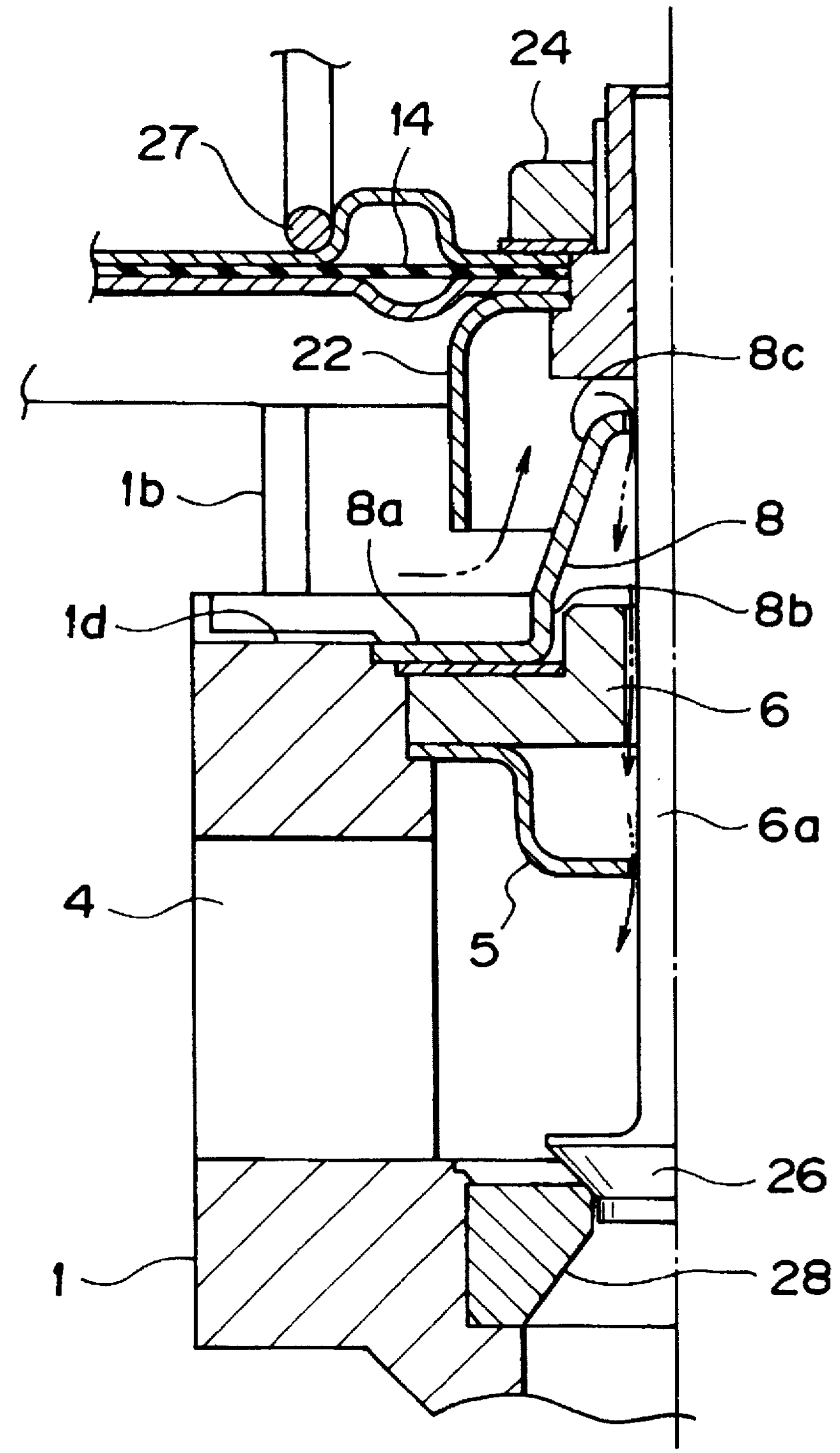
FIG. 8 is a fragmentary enlarged cross section used for purpose of comparison with an arrangement in which an air passage 29 is eliminated from the first embodiment shown in FIG. 1.

For purpose of comparison, FIG. 8 shows an arrangement of the described embodiment from which the air passage 29 is eliminated. It will be noted that when the air passage 29 is eliminated, there will occur a flow of air, as indicated by an arrow, from the clearance between the end face of the movable protective cover 22 and the flange 8a into the movable protective cover 22, increasing the effect of entangling a foreign matter such as water or dust which may be deposited on the housing 1 or the flange 8a.

Second Embodiment

Figure 2:
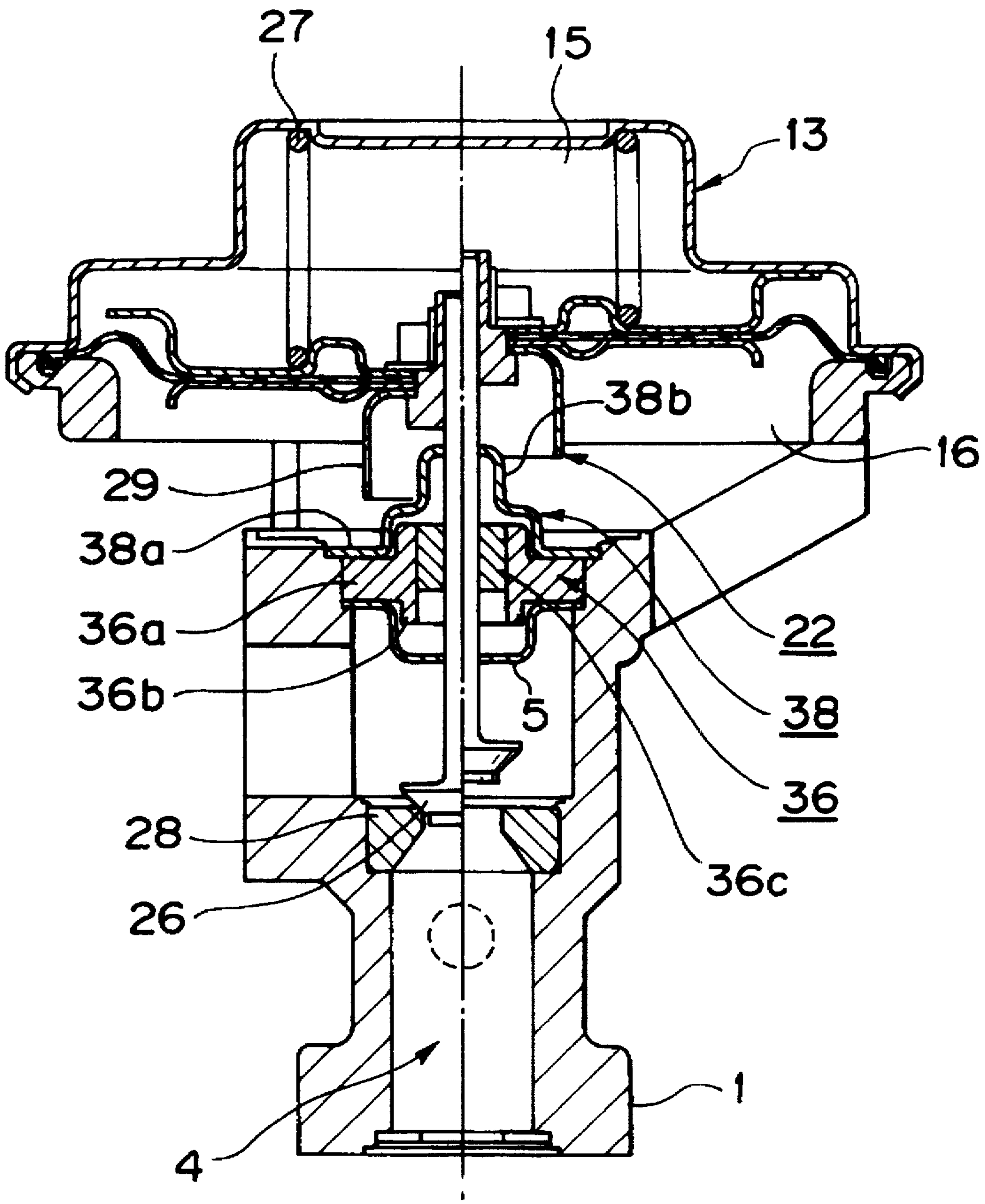
FIG. 2 is a cross section of a second embodiment of the invention, illustrating different operating conditions on the opposite sides of a centerline.

FIG. 2 shows a second embodiment of the invention in which the construction of a guide bushing 36 and a securing protective cover 38 is changed from corresponding parts shown in the first embodiment and in which an insulator which would have been provided between the guide bushing 36 and the securing protective cover 38 is eliminated.

In the present embodiment, the guide bushing 36 comprises a ring-shaped plate 36a, a tubular portion 36b disposed around the inner periphery of the plate, and a cylindrical bearing 36c which is secured, by a press fit, into the tubular portion 36b.

The securing protective cover 38 comprises a flange 38a which is placed on top of the plate 36a and a stepped tubular portion 38b continuing from the inner periphery of the flange 38a and extending upward in surrounding relationship with the upper portion and the upper end face of the tubular portion 36b and having a reducing diameter toward the diaphragm 14.

In other respects, the arrangement is similar to the first embodiment, and accordingly, corresponding parts to those shown in the first embodiment are designated by like reference numerals and characters as used for the first embodiment. The second embodiment achieves a similar function and effect as achieved by the first embodiment.

Third Embodiment

Figure 3:
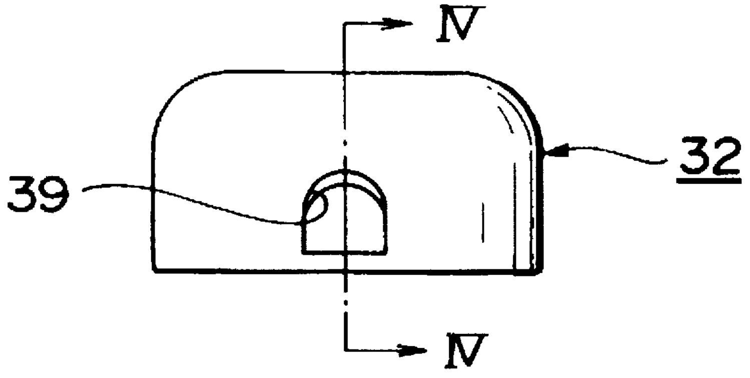
FIG. 3 is a front view of an essential part of a third embodiment of the invention.
Figure 4:
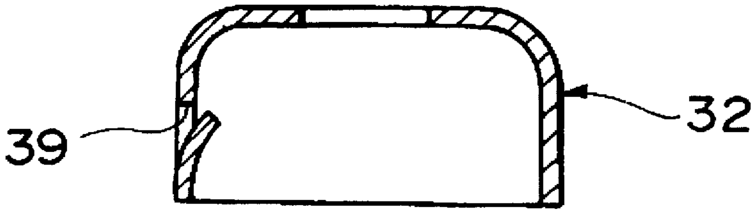
FIG. 4 is a cross section taken along the line IV—IV shown in FIG. 3.

FIG. 3 and 4 show a third embodiment of the invention. While the air passage 29 of the movable protective cover 22 comprises a circular through-aperture in both the first and the second embodiment, in the third embodiment, an air passage 39 is formed by a press bending operation of a movable protective cover 32.

Specifically, in the present embodiment, a cut is made into the outer peripheral surface of the movable protective cover 32 in an inverted U-configuration, leaving the bottom to be continuous to the outer peripheral surface of the movable protective cover 32 while the upper portion of the inverted U-configuration is curved into the movable protective cover 32 to form the air passage 39. While not shown, the cut may be in U-configuration rather than inverted U-configuration, leaving the top portion to be continuous with the outer peripheral surface of the movable protective cover 32 while the bottom portion of the top of the U-configuration is curved into the movable protective cover 32 to form an air passage.

Fourth Embodiment

Figure 5:
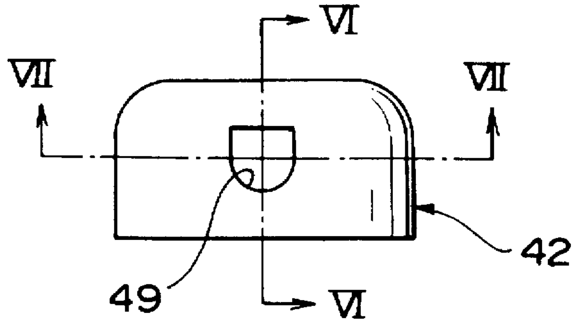
FIG. 5 is a front view of an essential part of a forth embodiment of the invention.
Figure 6:
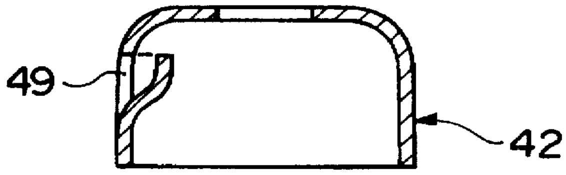
FIG. 6 is a cross section taken along the line VI—VI shown in FIG. 5.
Figure 7:
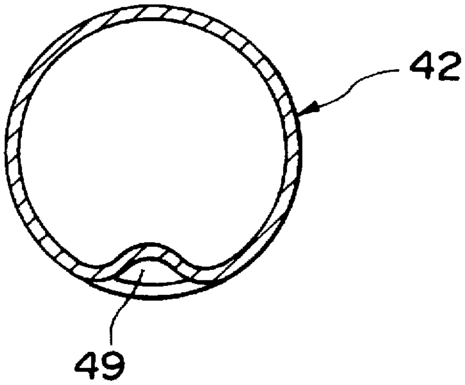
FIG. 7 is a cross section taken along the line VII—VII shown in FIG. 5.

FIG. 5 to 7 show a fourth embodiment of the invention in which a cut is made into the outer peripheral surface of a movable protective cover 42 in U-configuration, keeping the bottom to be continuous with the outer peripheral surface of the movable protective cover 42 while the top portion of the U-configuration is curved into the cup-shaped movable protective cover 42 in an S-configuration, thus forming an air passage 49. While not shown, alternatively, the cut may be formed in an inverted U-configuration rather than U-configuration, leaving the upper portion to be continuous with the outer peripheral surface of the movable protective cover 42 while the lower portion of the inverted U-configuration or the tip thereof is curved into the cup-shaped movable protective cover 42 in an S-configuration to form an air passage.

While not shown, the air passage may comprise a slit.

While the invention has been shown and described above in connection with several embodiments thereof, it should be understood that a number of changes, modifications and substitutions therein are possible by one skilled in the art from the above disclosure without departing from the scope and the spirit of the invention defined by the appended claims.

What is claimed is:

1. An exhaust gas recirculation system comprising an exhaust gas recirculation passage formed in a housing, a diaphragm case disposed within the housing, a diaphragm disposed in the diaphragm case to partition the diaphragm case to define pressure chambers, a valve connected to the diaphragm to be driven for movement back and forth to engage with and disengage from a valve seat mounted on the housing to open and close the exhaust gas recirculation passage, a guide bushing mounted on the housing for guiding the valve for movement back and forth in which the guide bushing is covered by a securing protective cover, and a cup-shaped movable protective cover mounted on the diaphragm to prevent foreign matter located between the covers from ingressing between the guide bushing and the valve;

characterized in that an air passage is formed in the movable protective cover and spaced away from the securing protective cover to substantially prevent entrainment of such foreign matter by air flow between the covers.

2. An exhaust gas recirculation system according to claim 1 in which the securing protective cover is mounted on the housing and is in turn covered by the movable protective cover, the movable protective cover being movable toward and away from the securing protective cover, the securing protective cover including a conical formation which is narrowed toward the diaphragm.

3. An exhaust gas recirculation system according to claim 1 in which the securing protective cover is mounted on the housing and is in turn covered by the movable protective cover, the movable protective cover being movable toward and away from the securing protective cover, the securing protective cover having a stepped tubular portion which has a reducing diameter toward the diaphragm.

4. An exhaust gas recirculation system according to claim 1 in which the air passage comprises a circular through-aperture.

5. An exhaust gas recirculation system according to claim 1 in which a cut is made in the outer peripheral surface of the movable protective cover in an inverted U-configuration, the top portion of the cut being curved into the movable protective cover to form a through-aperture in the outer peripheral surface of the movable protective cover, the through-aperture defining the air passage.

6. An exhaust gas recirculation system according to claim 1 in which a cut is made into the outer peripheral surface of the movable protective cover in a U-configuration, the bottom portion of the cut being curved into the movable protective cover in an S-configuration to provide a through-aperture in the outer peripheral surface of the movable protective cover, the through-aperture defining the air passage.

7. An exhaust gas recirculation system according to claim 1 in which the securing protective cover includes a flange toward the housing, which flange is mounted on the housing, the housing being formed with a water release groove which allows water accumulated on top of the flange of the securing protective cover to be discharged.

* * * * *

UNITED STATES PATENT AND TRADEMARK OFFICE

CERTIFICATE OF CORRECTION

PATENT NO. : 5 749 563

DATED : May 12, 1998

INVENTOR(S) : Yuji HOSAKA et al

It is certified that error appears in the above-identified patent and that said Letters Patent is hereby corrected as shown below:

Please add the following claim:

8. An exhaust gas recirculation system according to Claim 3 in which the securing protective cover includes a flange toward the housing, which flange is mounted on the housing, the housing being formed with a water release groove which allows water accumulated on top of the flange of the securing protective cover to be discharged.

Signed and Sealed this

Twenty-sixth Day of January, 1999

Attest:

Attesting Officer

Acting Commissioner of Patents and Trademarks